Aug. 31, 1926.
C. MOTT
1,598,149
LIQUID OXYGEN CONTAINER
Filed May 22, 1924
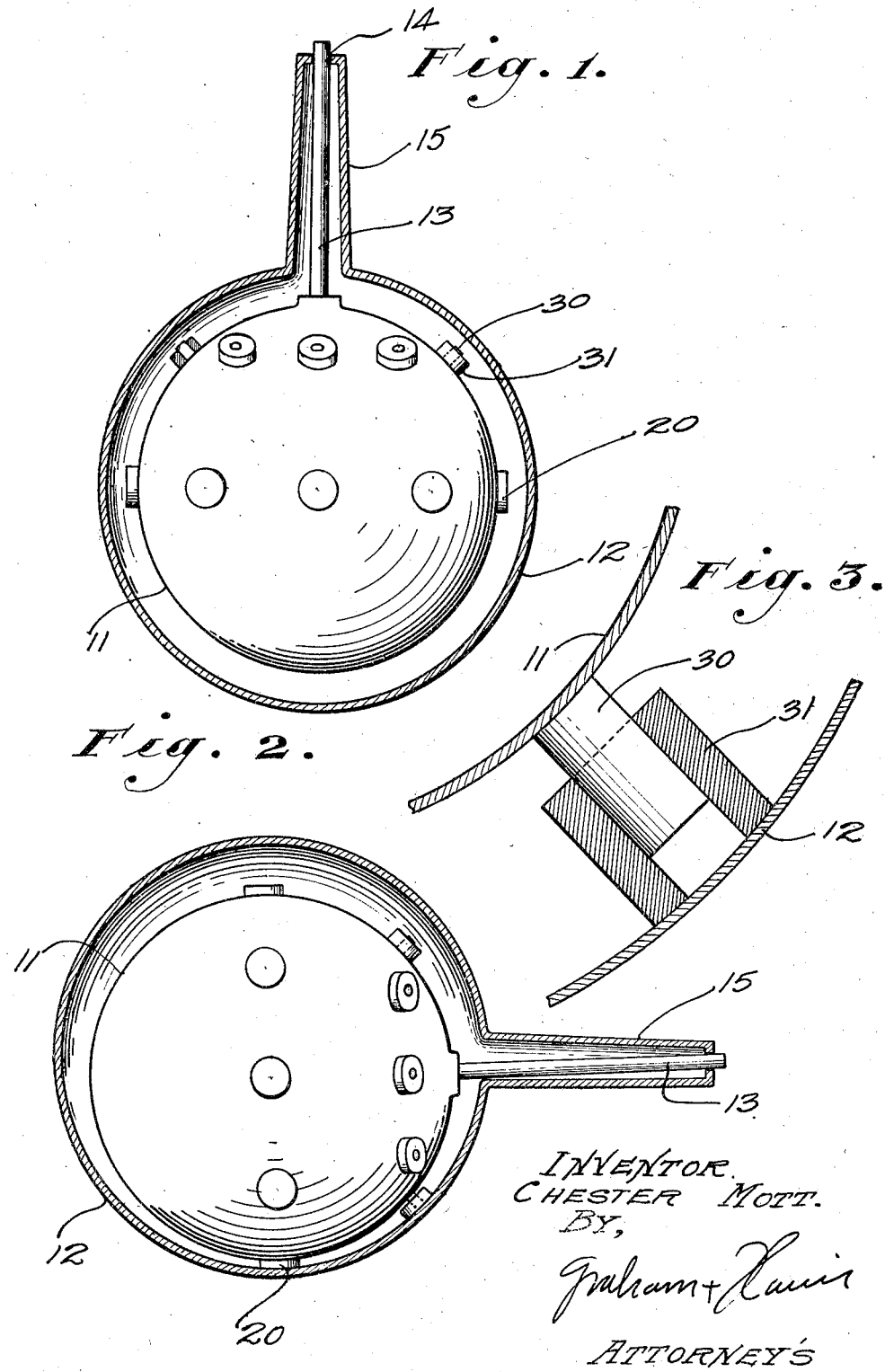
INVENTOR.
CHESTER MOTT.
BY,
Graham + Lewis
ATTORNEYS Patented Aug. 31, 1926.

1,598,149

UNITED STATES PATENT OFFICE.

CHESTER MOTT, OF DENVER, COLORADO, ASSIGNOR, BY MESNE ASSIGNMENTS, TO PUROX COMPANY, OF DENVER, COLORADO, A CORPORATION OF COLORADO.

LIQUID-OXYGEN CONTAINER.

Application filed May 22, 1924. Serial No. 715,060.

My invention relates to containers which are suitable for the storage and transportation of liquid oxygen.

Since liquid oxygen has a very low boiling point, it is necessary that any containers in which the liquid is stored or shipped be very thoroughly heat insulated, which is probably best accomplished by providing a vacuum space in the wall of the container. It is an object of the invention to provide a container of this character.

It is common practice at the present time to construct liquid oxygen containers in which there is an inner and outer shell, separated by a vacuum space. These shells are preferably made spherical and the inner shell is suspended on a long tube or pouring spout which extends up inside a tube secured to the outer shell, the two tubes being secured together at their upper ends. By providing some flexibility in the tubes or their connections, it is possible to construct a container in which the inner shell is not rigidly secured at any point to the outer shell but may swing in relation thereto. This is desirable as substantially all substances conduct some heat, and any substances which might be provided connecting the inner shell with the outer shell would necessarily conduct some heat. By hanging the inner shell by means of its long pouring spout inside the outer shell, a vacuum space is provided between the shells at all times without any solid material for conducting heat between the two shells through said space. The movement between the inner and outer shells in the ordinary type of container is also utilized to assist in pouring. When the container is turned over to bring the spout into the pouring position, the inner shell rests against the outer shell and heat is transferred to the contents, causing them to boil and greatly assist in the pouring.

The principal objection to the ordinary form of liquid oxygen container described above is that the inner shell tends to swing during transportation and to make frequent contact with the wall of the outer shell, thus causing momentary heat transfer which causes a slow but expensive evaporation of the liquid oxygen. It is an object of my invention to provide a liquid oxygen container which is provided with heat insulating pads which prevent contact between the inner and outer shells at all times, but are normally out of contact with one of these shells. This construction provides a container in which the shipping losses are very slight and in which the standing losses are not appreciably greater than in the present containers.

Since the inner shell in my form of invention cannot come in contact with the outer shell, violent boiling is at all times impossible, and, since a long tube is necessary in connection with the inner shell, the pouring of liquid oxygen therefrom is very slow. It is, therefore, a further object of my invention to provide auxiliary means for conducting heat from the outer shell to the inner shell whenever the container is turned into the pouring position, these means being inoperative when the container is standing or being shipped.

Further objects and advantages will be made evident hereinafter.

Referring to the drawing which is for illustrative purposes only,

Fig. 1 is a section through a liquid oxygen container in its standing position.

Fig. 2 is a similar view of the same container in its pouring position.

Fig. 3 is a section on an enlarged scale through one of the heat transfer devices.

In the form of the invention shown, I provide an inner shell 11 and an outer shell 12, the shell 11 being provided with a pouring spout 13 in the form of a long tube which extends upwardly, as shown at Fig. 1, when the container is in the standing position. This tube is secured at 14 to an outer tube 15, which in turn is secured to the outer shell 12. The proportion of the parts are such that the inner shell 11 tends to normally stand centrally in the outer shell 12 with the pouring spout 13 vertical. The outer shell 12 is supported by any suitable means, not shown, being usually mounted in a cylindrical metal shell or in some other sort of suitable crate. Such parts being old in the art are not shown and described herein. When the container is turned into the pouring position, as shown in Fig. 2, there is sufficient elasticity in the spouts 13 and 15 and their connecting structure to allow the inner shell 11 to fall down into the position shown in Fig. 2. When the standard type of container is turned into this position, the inner shell 11 is brought into intimate contact with the outer shell 12 and heat is transferred to the liquid oxygen, causing it to boil and form gas in the top of the shell 11, this gas being under sufficient pressure to force the liquid oxygen from the spout 13. As pointed out above, the construction of the present container is objectionable as the inner shell 12 tends to swing in transportation, thus making a momentary contact with the outer shell. To prevent the loss in shipment due to this swinging, I provide a plurality of insulating pads 20 which may be formed of felt or any other non-conducting material and which are so placed that they prevent any direct contact between the shells 11 and 12. The pads 20 are, however, of such size that when the container is standing, as shown in Fig. 1, there is no contact between the pads 20 and the outer shell 12, thus preventing any appreciable heat conduction therethrough while the container is standing. When the container is turned into the position shown in Fig. 2, however, the pads 20 prevent any appreciable conduction to the liquid oxygen and the pouring thereof would be very slow were not means provided for accelerating this pouring. I provide such means consisting of pins 30 secured to the inner container 11, these pins having rings 31 sliding freely thereon. The pins 30 and the rings 31 may be formed of copper, brass or other material having a high heat conductivity. The pins 30 are placed about the top of the inner shell 11, extending upwardly with the container in the standing position, as shown in Fig. 1, at such an angle that the rings 31 are held against the inner shell 11 by gravity, there being a considerable space between the end of the pin and the end of the ring 31 and the inner surface of the outer shell 12. There is substantially no conduction through the pins 30 and the rings 31 in the standing position. When, however, the container is turned into the position shown in Fig. 2, some of the rings 31 tend to slide downwardly into the position shown in Fig. 3, the ring 31 making contact with the outer shell 12 and conducting the heat from this shell through the pin 30 and the shell 31. The pins 30 are so placed and are of sufficient number to allow one of the rings 31 to fall whenever the spout 13 is lowered into any pouring position and the pins 30 and rings 31 are preferably so numerous that several of them fall whenever the spout is so turned. The pins 30 and rings 31, therefore, provide a conducting means for bridging the vacuum space between the shells 11 and 12 and thus deliver sufficient heat to the contents of the inner shell 11 to cause the liquid oxygen to boil and so produce a pouring pressure.

It will be seen that a liquid oxygen container made in accordance with my invention has all of the advantages of the old container, in that it readily establishes a pouring pressure when it is turned, but at the same time it has the additional advantage that the shipping losses are very much smaller than in a container in which the shells 11 and 12 may come in contact during shipment. It also has the advantage that if the container is only slightly tilted, only one of the rings 30 will function, but as the container is turned a greater distance additional rings 31 are brought into action and the rate of pouring is proportionately increased.

I claim as my invention:

1. In a liquid oxygen container, the combination of: an outer shell; an inner shell inside of and heat insulated from said outer shell; and a member movable in a fixed radial path with relation to said shells for making a thermal bridge between said shells when said container is turned into pouring position.

2. In a liquid oxygen container, the combination of: an outer shell having an elongated tube on the top thereof; an inner shell inside said outer shell; an elongated pouring spout extending upwardly from said inner shell inside said elongated tube; means for securing said spout to said tube, certain of said parts being sufficiently flexible to allow said inner shell free movement inside said outer shell whenever said spout is turned into the pouring position; a movable member of high thermal conductivity so placed as to make thermal contact with both said inner and outer shells when said container is turned into the pouring position; and insulating members so placed as to prevent said inner shell from coming into direct thermal contact with the inner surface of said outer shell.

3. In a liquid oxygen container, the combination of: an outer shell having an elongated tube on the top thereof; an inner shell inside said outer shell; an elongated pouring spout extending upwardly from said inner shell inside said elongated tube means for securing said spout to said tube, certain of said parts being sufficiently flexible to allow said inner shell free movement inside said outer shell whenever said spout is turned into the pouring position; a movable member of high thermal conductivity so placed as to make thermal contact with both said inner and outer shells when said container is turned into the pouring position; and insulating members so placed as to prevent said inner shell from coming into direct thermal contact with the inner surface of said outer shell, said insulating members being of such proportions as to allow said inner shell a limited movement in said outer shell.

4. In a liquid oxygen container, the combination of: an outer shell having an elongated tube on the top thereof; an inner shell inside said outer shell; an elongated pouring spout extending upwardly from said inner shell inside said elongated tube; means for securing said spout to said tube, certain of said parts being sufficiently flexible to allow said inner shell free movement inside said outer shell whenever said spout is turned into the pouring position; a plurality of pins projecting radially outward from the outer surface of said inner shell above the horizontal diameter thereof; a plurality of rings, each ring fitting loosely over one of said pins, said pins and rings being normally out of contact with the inner surface of said outer shell but so placed that one or more of said rings can slip down and make contact with the inner surface of said outer shell, without losing contact with its pin, whenever said container is turned into the pouring position; and insulating members so placed as to prevent said inner shell from coming into direct thermal contact with the inner surface of said outer shell.

5. In a liquid oxygen container, the combination of: an outer shell having an elongated tube on the top thereof; an inner shell inside said outer shell; an elongated pouring spout extending upwardly from said inner shell inside said elongated tube; means for securing said spout to said tube, certain of said parts being sufficiently flexible to allow said inner shell free movement inside said outer shell whenever said spout is turned into the pouring position; a plurality of pins projecting radially outward from the outer surface of said inner shell above the horizontal diameter thereof; a plurality of rings, each ring fitting loosely over one of said pins, said pins and rings being normally out of contact with the inner surface of said outer shell but so placed that one or more of said rings can slip down and make contact with the inner surface of said outer shell, without losing contact with its pin, whenever said container is turned into the pouring position; and insulating members so placed as to prevent said inner shell from coming into direct thermal contact with the inner surface of said outer shell, said insulating members being of such proportions as to allow said inner shell a limited movement in said outer shell.

6. In a liquid oxygen container having a heat insulating space between the inner and outer shells thereof, the combination of: a thermal bridge in said space; and means fixed to one of said shells for so supporting said bridge that it normally makes thermal contact with only one of said shells, said bridge dropping down in a fixed path and making thermal contact with the other shell whenever said container is turned from its normal position.

7. In a liquid oxygen container having an inner and outer shell separated by a heat insulating space, the combination of: a pin secured to one of said shells and normally projecting upwardly towards the other shell without actually coming into thermal contact therewith; and a ring normally seated on said pin in such a position that it normally does not make thermal contact with said other shell, said ring being sufficiently loose on said pin to allow it to drop down and make thermal contact with said other shell whenever said pin becomes pointed downwardly due to turning said container.

8. In a liquid oxygen container, the combination of: an outer shell; an inner shell suspended inside said outer shell; means for preventing said inner shell from coming into direct thermal contact with said outer shell; and means for making thermal contact between said inner and outer shells when said container is swung into pouring position.

9. In a liquid oxygen container, the combination of: an outer shell; an inner shell flexibly suspended inside said outer shell, said shells being heat insulated from each other; insulation means for preventing said inner shell from coming into direct thermal contact with said outer shell; and means for making thermal contact between said inner and outer shells when said container is swung into pouring position.

10. In a liquid oxygen container, the combination of: an outer shell; an inner shell flexibly suspended inside said outer shell, said shells being heat insulated from each other; insulation pads for preventing said inner shell from swinging into direct thermal contact with said outer shell; and means for making thermal contact between said inner and outer shells when said container is swung into pouring position.

In testimony whereof, I have hereunto set my hand at Denver, Colorado, this 12th day of May, 1924.

CHESTER MOTT.